United States Patent
Stoev et al.

(10) Patent No.: US 7,212,384 B1
(45) Date of Patent: May 1, 2007

(54) MAGNETIC READ HEAD WITH RECESSED HARD BIAS AND CURRENT LEADS

(75) Inventors: Kroum S. Stoev, Fremont, CA (US); Amritpal S. Rana, Union City, CA (US); Francis H. Liu, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 441 days.

(21) Appl. No.: 10/788,653

(22) Filed: Feb. 27, 2004

(51) Int. Cl.
*G11B 5/39* (2006.01)
(52) U.S. Cl. ............................................. 360/324.12
(58) Field of Classification Search ............ 360/324.12
See application file for complete search history.

(56) References Cited

U.S. PATENT DOCUMENTS

| | | | | |
|---|---|---|---|---|
| 6,847,508 B2* | 1/2005 | Tanaka et al. | ......... | 360/324.12 |
| 7,092,218 B2* | 8/2006 | Hasegawa et al. | ......... | 360/321 |

* cited by examiner

*Primary Examiner*—A. J. Heinz
(74) *Attorney, Agent, or Firm*—Jonathan E. Prejean, Esq.

(57) ABSTRACT

A read element includes a magnetoresistive sensor having a side and an upper surface that defines an edge. An underlayer overlies the side of the magnetoresistive sensor, and a hard bias layer overlies at least part of the underlayer and defines a hard bias junction with the underlayer. A lead is formed atop the hard bias layer. The hard bias junction is recessed from the edge of the magnetoresistive sensor by a predetermined recess distance, to provide stability and sensitivity to the read element.

24 Claims, 6 Drawing Sheets

MAGNETIC READ HEAD WITH RECESSED HARD BIAS AND CURRENT LEADS

FIELD OF THE INVENTION

The present invention generally relates to data storage devices such as disk drives, and it particularly relates to a read/write head for use in such data storage devices. More specifically, the present invention provides a new head design with improved stability, increased sensitivity, and reduced side reading, by selectively recessing the hard bias and the current leads.

BACKGROUND OF THE INVENTION

An exemplary conventional high capacity magnetic storage system typically uses magnetoresistive read (MR) sensors to read data from a surface of the magnetic disk. An MR sensor comprises an MR sensing layer. Data stored in the form of a magnetic field emanating from the magnetic disk changes the resistance of the MR sensing layer. This change in resistance allows the MR sensor to detect the magnetic field on the magnetic disk. The resistance of the MR sensor changes as a function of the magnitude and direction of the magnetic flux from the magnetic disk.

A giant magnetoresistive (GMR) sensor is a type of MR sensor that comprises a GMR stack. The GMR stack includes a plurality of magnetic layers that are separated by a non-magnetic layer. The magnetization of one of the magnetic layers (the pinned layer) is pinned by exchange coupling with an antiferromagnetic layer.

Another magnetic layer (the free layer) is not pinned; the magnetic moments in this layer are free to rotate in response to the field from the magnetic disk. The electrical resistance of GMR sensor depends on the relative alignment of the magnetic moments in the free layer and the pinned layer. The magnetic field from the magnetic disk induces a change in the direction of magnetization in the free layer, thus changing the resistance of the GMR sensor.

The change in resistance of the GMR sensor can be measured by applying a current to the GMR sensor. The GMR sensor comprises conductive lead structures that connect to the GMR stack, providing means for applying current to the GMR stack. The change in resistance of a GMR sensor is typically determined by applying a constant current and measuring voltage variations caused by the change in resistance. Conventional GMR sensors are biased by a permanent magnetic known as a hard bias (HB). The hard bias provides a preferred direction or "off" resistance for the free layer in the GMR stack.

Although this technology has proven to be useful, it would be desirable to present additional improvements. A large hard bias layer is desired for better thermal and magnetic stability of the GMR sensor. However, as the hard bias layer increases in size, the "on" resistance of the free layer decreases, providing a lower amplitude voltage (or output signal) when reading the magnetic disk.

As the areal density of magnetic disks increases, magnetic read widths decrease. At very low magnetic read widths (below approximately 0.15 micron), the two sides of the permanent magnetic material in the hard bias are very close. Consequently, the hard bias field in the GMR sensor could cause the output signal to be below an acceptable level.

To maintain the amplitude of the output signal from the GMR sensor, the strength of the magnetic field applied by the permanent magnetic material in the hard bias is decreased. A hard bias at these small thicknesses is however susceptible to degradation.

At very low track widths, the hard bias becomes very thin and the junctions of the hard bias closest to the GMR stack become unstable. At high temperature, the junctions of the hard bias become demagnetized, allowing an increase in side reading. The read width of the MR sensor essentially becomes wider. In addition, magnetic instability of the device response is introduced by the weakening of the hard bias.

Furthermore, the top shield region that overlies the GMR stack should be as flat as possible to minimize side reading by the GMR sensor. At very low magnetic read widths (i.e., below approximately 0.15 micron), the conventional topography of the conductive leads does not allow this top shield region to be flat across substantially the entire width of the GMR stack, thus increasing undesirable side reading.

Therefore, what is needed is an MR read sensor with improved stability, increased amplitude of the output signal, and reduced side reading. The need for such an MR read sensor has heretofore remained unsatisfied.

SUMMARY OF THE INVENTION

The present invention can be regarded as a read/write head for use in a data storage device to provide improved stability, increased sensitivity, and reduced side reading, by selectively recessing the hard bias and the current leads. The read/write head comprises a read element that includes a magnetoresistive sensor having a side and an upper surface that defines an edge. An underlayer overlies the side of the magnetoresistive sensor, and a hard bias layer overlies at least part of the underlayer and defines a hard bias junction with the underlayer. A lead is formed atop the hard bias layer. The hard bias junction is recessed from the edge of the magnetoresistive sensor by a predetermined recess distance, to provide stability and sensitivity to the read element.

DETAILED DESCRIPTION OF PREFERRED EMBODIMENTS

Figure 1:
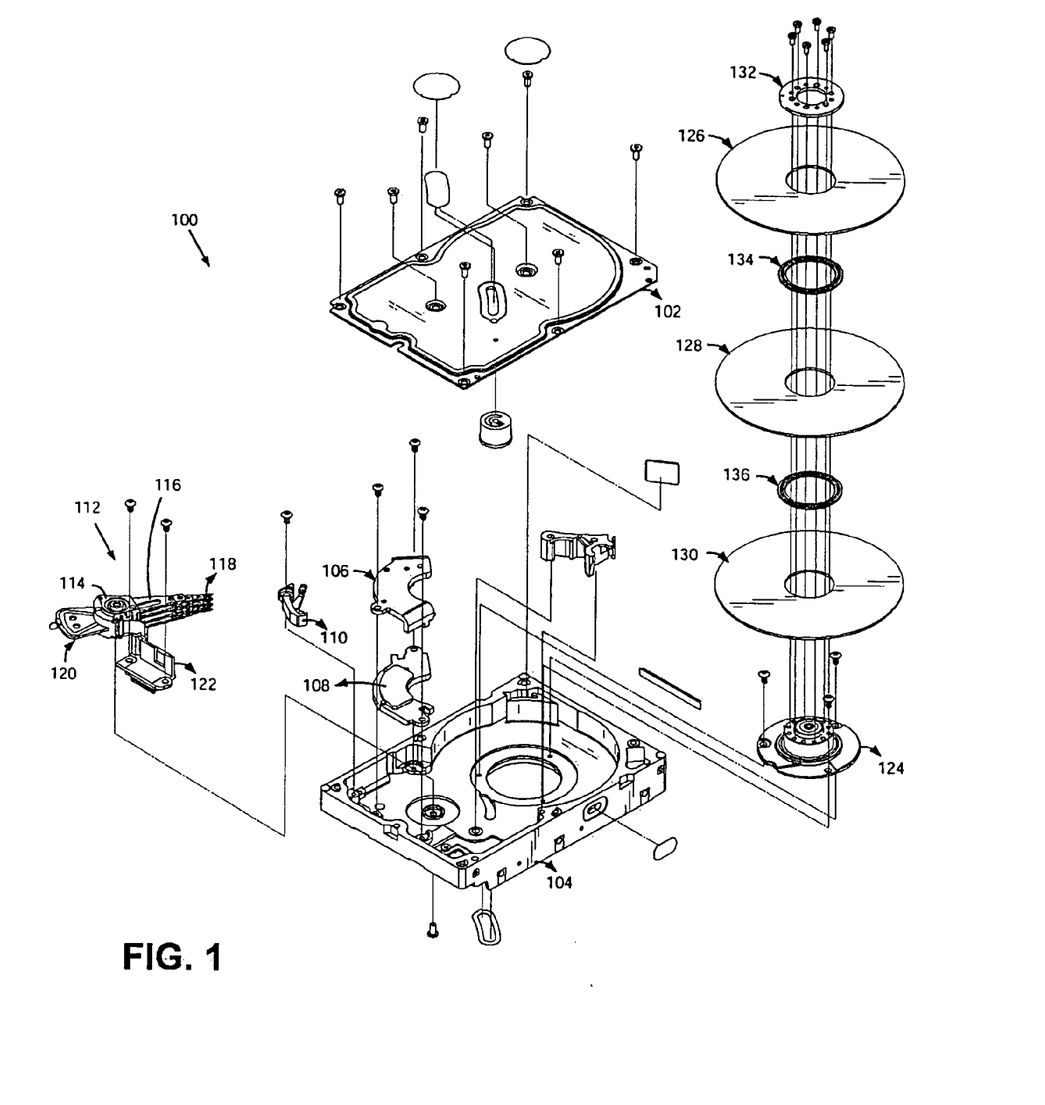
FIG. 1 is a fragmentary perspective view of a data storage device utilizing a read/write head of the present invention.

FIG. 1 illustrates a hard disk drive 100 in which an embodiment of the present invention may be used. An enclosure of the hard disk drive 100 comprises a cover 102 and a base 104. The enclosure is suitably sealed to provide a relatively contaminant-free interior for a head disk assembly (HDA) portion of the hard disk drive 100. The hard disk drive 100 also comprises a printed circuit board assembly (not shown) that is attached to base 104 and further comprises the circuitry for processing signals and controlling operations of the hard disk drive 100.

Within its interior, the hard disk drive 100 comprises a magnetic disk 126 having a recording surface typically on each side of the disk, and comprises a magnetic head or slider that may suitably be a magneto-resistive ("MR") head such as a GMR head. The GMR head has an MR element for reading stored data on a recording surface and an inductive element for writing data on the recording surface. The exemplary embodiment of the hard disk drive 100 illustrated in FIG. 1 comprises three magnetic disks 126, 128, and 130 providing six recording surfaces, and further comprises six magnetic heads.

Disk spacers such as spacers 134 and 136 are positioned between magnetic disks 126, 128, 130. A disk clamp 132 is used to clamp disks 126, 128, 130 on a spindle motor 124. In alternative embodiments, the hard disk drive 100 may comprise a different number of disks, such as one disk, two disks, and four disks and a corresponding number of magnetic heads for each embodiment. The hard disk drive 100 further comprises a magnetic latch 110 and a rotary actuator arrangement. The rotary actuator arrangement generally comprises a head stack assembly 112 and voice coil magnet ("VCM") assemblies 106 and 108. The spindle motor 124 causes each magnetic disk 126, 128, 130 positioned on the spindle motor 124 to spin, preferably at a constant angular velocity.

A rotary actuator arrangement provides for positioning a magnetic head over a selected area of a recording surface of a disk. Such a rotary actuator arrangement comprises a permanent-magnet arrangement generally including VCM assemblies 106, 108, and head stack assembly 112 coupled to base 104. A pivot bearing cartridge is installed in a bore of the head stack assembly 112 and comprises a stationary shaft secured to the enclosure to define an axis of rotation for the rotary actuator arrangement.

The head stack assembly 112 comprises a flex circuit assembly and a flex bracket 122. The head stack assembly 112 further comprises an actuator body 114, a plurality of actuator arms 116 cantilevered from the actuator body 114, a plurality of head gimbal assemblies 118 each respectively attached to an actuator arm 116, and a coil portion 120. The number of actuator arms 116 and head gimbal assemblies 118 is generally a function of the number of magnetic disks in a given hard disk drive 100.

Figure 2:
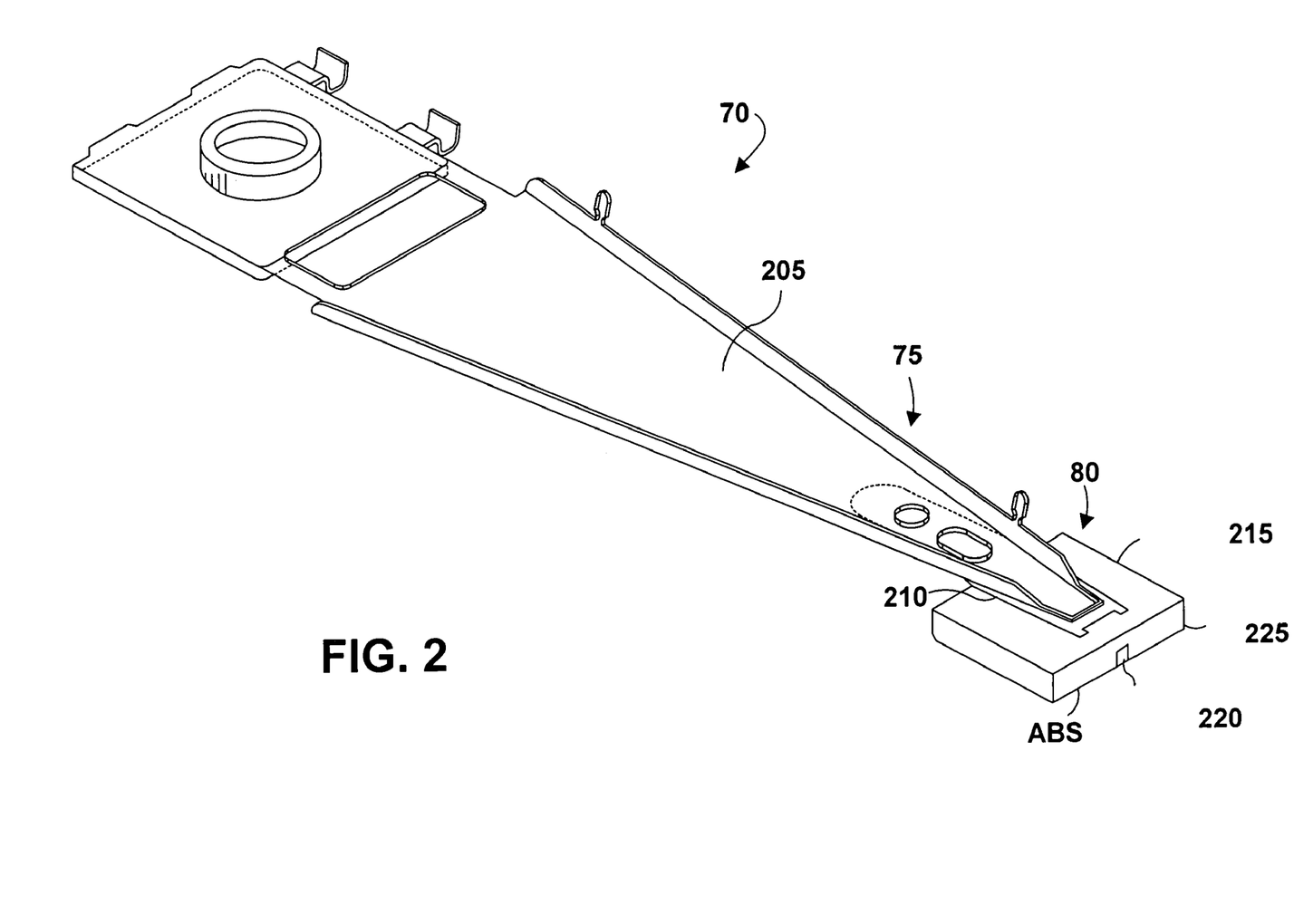
FIG. 2 is a perspective view of a head gimbal assembly comprised of a suspension, and a slider to which the read/write head of FIG. 1 is secured, for use in a head stack assembly.

Each of the head gimbal assemblies (HGA) 118 is secured to one of the actuator arms 116. As illustrated in FIG. 2, HGA 118 is comprised of a suspension 205 and a read/write head 210. The suspension 205 comprises a resilient load beam 215 and a flexure 220 to which the read/write head 210 is secured.

The read/write head 210 comprises a slider 225 secured to the free end of the resilient load beam 215 by means of flexure 220 and a read/write element 230 supported by slider 225. In the example illustrated in FIG. 2, the read/write element 230 is secured to the trailing edge 235 of slider 225. Slider 225 can be any conventional or available slider. In another embodiment, more than one read/write element 230 can be secured to the trailing edge 235 or other side(s) of slider 225. The read/write element 230 comprises a write element and a read element.

Figure 3:
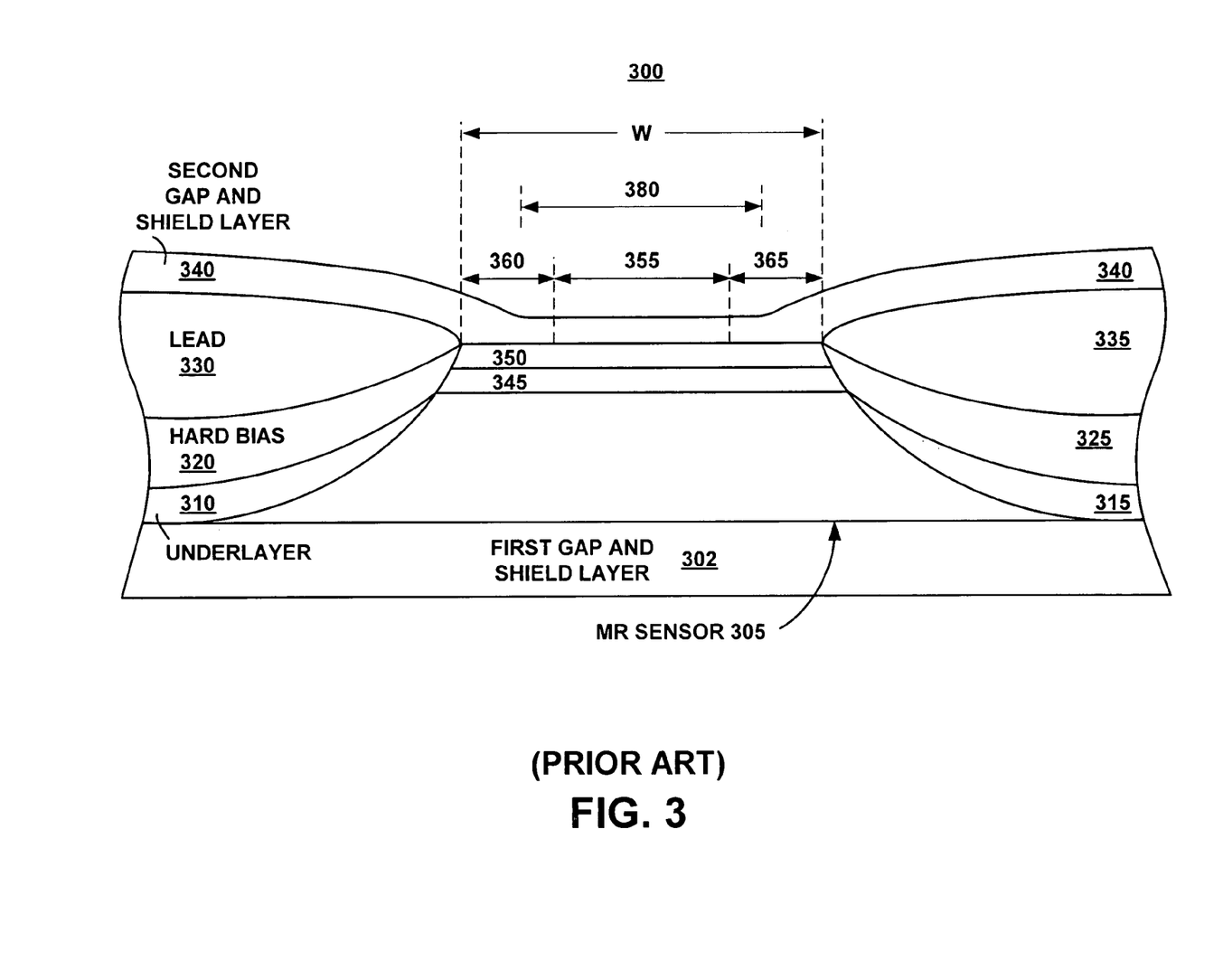
FIG. 3 is a cross-sectional view of a conventional MR sensor.

A cross-sectional view of a conventional magnetoresistive read (MR) read element 300 is illustrated FIG. 3. The exemplary conventional read element 300 comprises a giant magnetoresistive (GMR) stack 305; a chromium (Cr) underlayer 310, 315; a hard bias 320, 325; a current lead 330, 335; and a shield layer 340. The GMR stack 305 comprises a first gap and a first shield layer that are collectively referenced by the numeral 305; a stack of layers, such as a first pinned layer, an Ru spacer, a second pinned layer, and a copper spacer that are collectively referred to herein as the pinned layer, and referenced by the numeral 345; a free layer 350; and a cap that is not shown for the purpose of simplifying the illustration. A second gap and a second shield that are collectively referred to herein as the second shield layer, and referenced by the numeral 340, overlie the lead 330, 335, the free layer 350, and the cap.

The free layer 350 comprises an active region 355 and two dead zones 360, 365. The hard bias 320, 325 is sized to provide adequate magnetic field to pin the free layer 350 in the GMR stack 305. Consequently, the magnetic field from the hard bias 320, 325 in the dead zones 360, 365 causes the dead zones 360, 365 not to respond to the magnetic field of a magnetic disk such as magnetic disk 126.

In addition, the hard bias 320, 325 tapers in proximity to the GMR stack 305. The taper regions of the hard bias 320, 325 are susceptible to thermal instabilities, allowing side reading by the GMR stack 305.

Furthermore, the relatively flat region 380 of second shield layer 340 is less than the width W of the GMR stack 305. Consequently, additional side reading is induced in the GMR stack 305.

Figure 4:
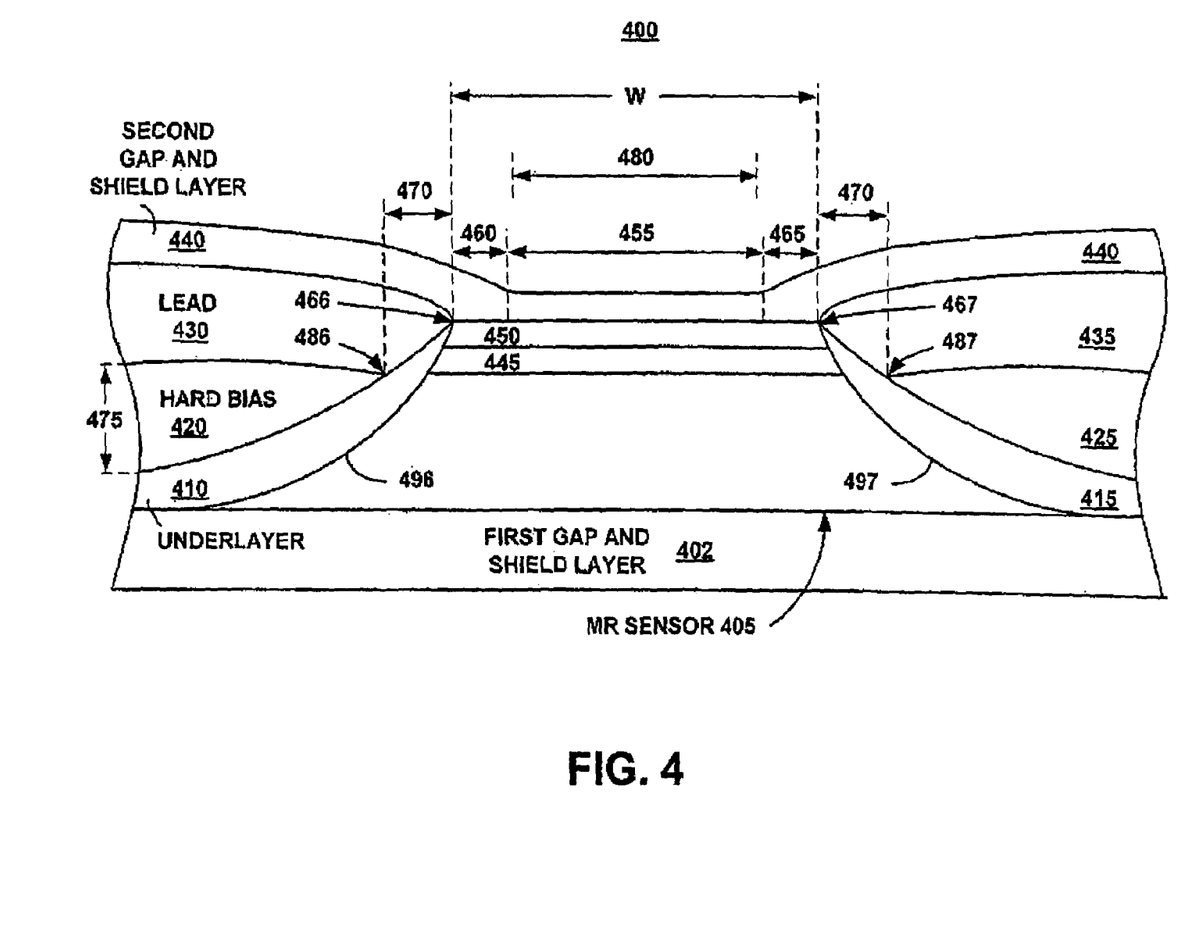
FIG. 4 is a cross-sectional view of an MR sensor with a recessed hard bias.

FIG. 4 illustrates a cross-section of a read element 400 according to the present invention. The read element 400 comprises a magnetoresistive (MR) sensor 405, for example, a spin valve, a giant a magnetoresistive sensor (GMR), an anisotropy magnetoresistive sensor (AMR), a colossal magnetoresistive sensor (CMR). In order to facilitate the illustration and description of the present invention, the MR sensor 405 will be described as a GMR sensor.

The read element 400 further includes a first gap and a first shield layer that are collectively referenced by the numeral 405; a chromium underlayer 410, 415; a hard bias 420, 425; current leads 430, 435; and a second gap second and a second shield layer that are collectively referenced by the numeral 440. Similarly to the GMR stack 405, and as described earlier, the GMR stack 405 comprises a pinned layer 445 and a free layer 450. The free layer 450 comprises an active region 455 and two dead zones 460, 465.

The hard bias 420, 425 is recessed from the edges 466, 467 of the GMR stack 405, so that a recess distance 470 of, for example, approximately 0.5 to 20 nm, is formed between each of the edges 466, 467 and the corresponding hard bias junctions 486, 487, respectively. The thickness 475 of the hard bias 420, 425 is selected to provide the desired magnetic field in the GMR stack 405, so as to pin the free layer 450. Since the hard bias 420, 425 is recessed from the GMR stack 405, the thickness 475 of the hard bias 420, 425 can be larger than in conventional read element 330 of FIG. 3.

Relative to the conventional sensor 300 of FIG. 3, the hard bias 420, 425 of the present sensor 400 is thicker than the sensor 300, at a distance from the GMR stack 405, and tapers, that is gets progressively becomes narrower, toward the GMR stack 405 where it terminates. The present design of the hard bias 420, 425 provides added thermal and magnetic stability to the sensor 400, since the hard bias could be made thicker than in conventional designs.

In addition, recessing the hard bias 420, 425 from the edges 466 and 467 of the GMR stack 405, reduces the magnetic field applied to the edge of the GMR stack 405. Consequently, the dead zones 460, 465 that do not respond to the magnetic field of the magnetic disk 126 are small compared to the conventional read element 300. Because active region 455 is wider than the corresponding active region 355 of the conventional read element 300, the read element 400 is more sensitive to the magnetic field of the magnetic disk 126 and provides an output signal with higher amplitude.

In one embodiment, recessing the hard bias 420, 425 can be implemented by extending the chromium layers 410, 415, so that the underlayers 410, 415 overlie the sides 496 and 497 of the GMR stack 405, respectively, and extend to the edges 466, 467, respectively. The effect of extending the chromium layers 410, 415 on the magnetic field applied to the GMR stack 405 by the hard bias 420, 425 is illustrated in the graph 500 of FIG. 5. The exemplary magnetic disk used for analysis in FIG. 5 has a data storage capacity of 80 GB or higher.

Figure 5:
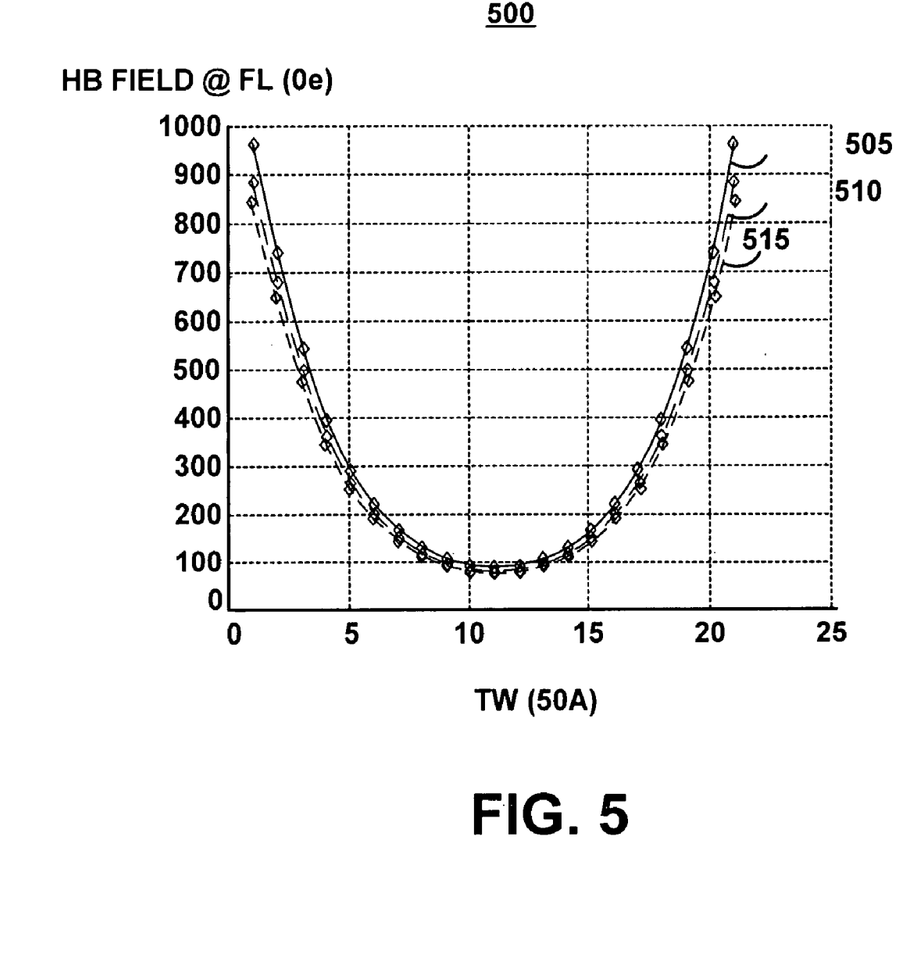
FIG. 5 is a graph illustrating the effect of increasing the width of a chromium layer on a magnetic field in the MR sensor of FIG. 4.

Referring to graph 500, the magnetic field of the hard bias 420, 425 is plotted as a function of distance across the GMR stack 405, where the origin corresponds to one side of the GMR stack 405. The magnetic field of the hard bias 420, 425 is plotted for three thicknesses of the chromium layer 410, 415: 165 Å, 185 Å, and 210 Å. Line 505 corresponds to the chromium layer 410, 415 with thickness 165 Å. Line 510 corresponds to the chromium layer 410, 415 with thickness 185 Å. Line 515 corresponds to the chromium layer 410, 415 with thickness 210 Å.

As the thickness of the chromium layer 410, 415 increases, the recess distance 470 increases. Consequently, the magnetic field at the edges of the GMR stack 405 decreases while the magnetic field at the center of the GMR stack 405 maintains the desired magnitude for pinning the free layer 450. The edges of the GMR stack 405 correspond to approximately 1 Å and approximately 21 Å in graph 500. At these points, the amplitude of the magnetic field from the hard bias 420, 425 is approximately 980 Oe for a chromium layer 410, 415 of thickness of 165 Å and approximately 840 Oe for a chromium layer 410, 415 of thickness 210 Å, a reduction of approximately 15%.

Figure 6:
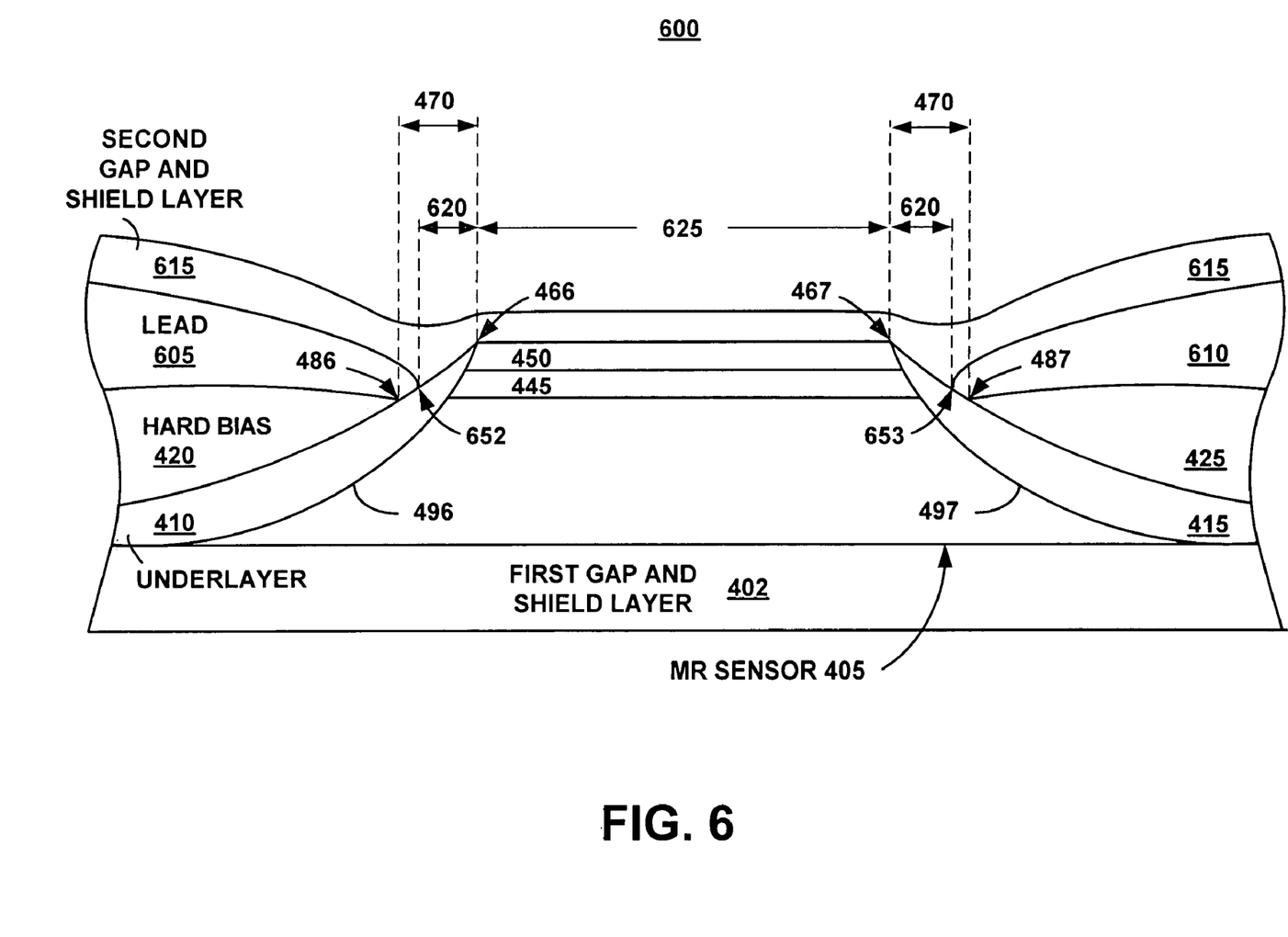
FIG. 6 is a cross-sectional view of an alternative MR sensor according to the present invention, having a recessed hard bias and recessed current leads.

FIG. 6 illustrates another embodiment of the present invention wherein a read element 600, in which current leads 605, 610 are recessed from the edges 466, 467 of the GMR stack 405. Recess distance 620, between the edges 466, 467 and the corresponding lead junctions 652, 653, respectively, may range from approximately 0.5 to 20 nm. Recess distance 470 between the edges 466, 467 and the corresponding hard bias junctions 486, 487, may range from approximately 0.5 to 20 nm. It should be clear that while the lead junctions 652, 653 are shown as a being distinct and a distance from the corresponding hard bias junctions 486, 487, these junctions could coincide and co-located. Recessing current leads 605, 610 allows the shield layer 615 to form a flat region 625 over the substantially the entire width of the GMR stack 405, reducing side reading induced by the shape of the shield layer 615 at the edges 466, 467 of the GMR stack 405.

What is claimed is:

1. A read element for use in a data storage device, comprising:
   a magnetoresistive sensor having a side, and an upper surface that defines an edge;
   an underlayer that overlies the side of the magnetoresistive sensor;
   a hard bias layer that overlies at least part of the underlayer and that defines a hard bias junction with the underlayer;
   a lead formed atop the hard bias layer; and
   wherein the hard bias junction is recessed from the edge of the magnetoresistive sensor by a predetermined recess distance, the lead extends toward the magnetoresistive sensor between the hard bias junction, and the magnetoresistive sensor edge and the recess distance ranges between approximately 0.5 and 20 nm.

2. The read element of claim 1, wherein the underlayer extends to the magnetoresistive sensor edge.

3. The read element of claim 1, wherein the magnetoresistive sensor includes any one of: a spin valve, a giant a magnetoresistive sensor (GMR), an anisotropy magnetoresistive sensor (AMR), and a colossal magnetoresistive sensor (CMR).

4. The read element of claim 1, further comprising a shield layer that overlies the lead and the magnetoresistive sensor.

5. A read element for use in a data storage device, comprising:
   a magnetoresistive sensor having a side, and an upper surface that defines an edge;
   an underlayer that overlies the side of the magnetoresistive sensor;
   a hard bias layer that overlies at least part of the underlayer and that defines a hard bias junction with the underlayer;
   a lead formed atop the hard bias layer; and
   wherein the hard bias junction is recessed from the edge of the magnetoresistive sensor by a predetermined recess distance and the lead is recessed from the magnetoresistive sensor edge to form a flat profile of the shield layer over the upper surface of the magnetoresistive sensor.

6. The read element of claim 5, wherein the underlayer extends to a lead junction that is recessed from the magnetoresistive sensor edge by a lead recess distance.

7. The read element of claim 6, wherein the lead recess distance ranges between approximately 0.5 and 20 nm.

8. The read element of claim 5, wherein the flat profile of the shield layer extends over substantially the entire width of the magnetoresistive sensor.

9. A disk drive comprising:
   a base;
   a spindle motor attached to the base;
   a disk positioned on the spindle motor;
   a head stack assembly coupled to the base and comprising:
      an actuator body;
      an actuator arm cantilevered from the actuator body; and
      a read element coupled to the actuator arm, and including:
         a magnetoresistive sensor having a side, and an upper surface that defines an edge;
         an underlayer that overlies the side of the magnetoresistive sensor;
         a hard bias layer that overlies at least part of the underlayer and that defines a hard bias junction with the underlayer;
         a lead formed atop the hard bias layer; and
         wherein the hard bias junction is recessed from the edge of the magnetoresistive sensor by a predetermined recess distance, the lead extends toward the magnetoresistive sensor between the hard bias junction and the magnetoresistive sensor edge, and the recess distance ranges between approximately 0.5 and 20 nm.

10. The hard drive of claim 9, wherein the underlayer extends to the magnetoresistive sensor edge.

11. The hard drive of claim 9, wherein the magnetoresistive sensor includes any one of: a spin valve, a giant a magnetoresistive sensor (GMR), an anisotropy magnetoresistive sensor (AMR), and a colossal magnetoresistive sensor (CMR).

12. The hard drive of claim 9, further comprising a shield layer that overlies the lead and the magnetoresistive sensor.

13. A disk drive comprising:
   a base;
   a spindle motor attached to the base;
   a disk positioned on the spindle motor;
   a head stack assembly coupled to the base and comprising:
      an actuator body;
      an actuator arm cantilevered from the actuator body; and
      a read element coupled to the actuator arm, and including:
         a magnetoresistive sensor having a side, and an upper surface that defines an edge;
         an underlayer that overlies the side of the magnetoresistive sensor;
         a hard bias layer that overlies at least part of the underlayer and that defines a hard bias junction with the underlayer;
         a lead formed atop the hard bias layer; and
      wherein the hard bias junction is recessed from the edge of the magnetoresistive sensor by a predetermined recess distance and the lead is recessed from the magnetoresistive sensor edge to form a flat profile of the shield layer over the upper surface of the magnetoresistive sensor.

14. The hard drive of claim 13, wherein the underlayer extends to a lead junction that is recessed from the magnetoresistive sensor edge by a lead recess distance.

15. The hard drive of claim 14, wherein the lead recess distance ranges between approximately 0.5 and 20 nm.

16. The hard drive of claim 13, wherein the flat profile of the shield layer extends over substantially the entire width of the magnetoresistive sensor.

17. A read/write head for use in a data storage device, comprising:
   a write element; and
   a read element that includes:
      a magnetoresistive sensor having a side, and an upper surface that defines an edge;
      an underlayer that overlies the side of the magnetoresistive sensor;
      a hard bias layer that overlies at least part of the underlayer and that defines a hard bias junction with the underlayer;
      a lead formed atop the hard bias layer; and
   wherein the hard bias junction is recessed from the edge of the magnetoresistive sensor by a predetermined recess distance, the lead extends toward the magnetoresistive sensor between the hard bias junction and the magnetoresistive sensor edge, and the recess distance ranges between approximately 0.5 and 20 nm.

18. The read/write head of claim 17, wherein the underlayer extends to the magnetoresistive sensor edge.

19. The read/write head of claim 17, wherein the magnetoresistive sensor includes any one of: a spin valve, a giant a magnetoresistive sensor (GMR), an anisotropy magnetoresistive sensor (AMR), and a colossal magnetoresistive sensor (CMR).

20. The read/write head of claim 17, further comprising a shield layer that overlies the lead and the magnetoresistive sensor.

21. A read/write head for use in a data storage device, comprising:
   a write element; and
   a read element that includes:
      a magnetoresistive sensor having a side, and an upper surface that defines an edge;
      an underlayer that overlies the side of the magnetoresistive sensor;
      a hard bias layer that overlies at least part of the underlayer and that defines a hard bias junction with the underlayer;
      a lead formed atop the hard bias layer; and
   wherein the hard bias junction is recessed from the edge of the magnetoresistive sensor by a predetermined recess distance and the lead is recessed from the magnetoresistive sensor edge to form a flat profile of the shield layer over the upper surface of the magnetoresistive sensor.

22. The read/write head of claim 21, wherein the underlayer extends to a lead junction that is recessed from the magnetoresistive sensor edge by a lead recess distance.

23. The read/write head of claim 22, wherein the lead recess distance ranges between approximately 0.5 and 20 nm.

24. The read/write head of claim 21, wherein the flat profile of the shield layer extends over substantially the entire width of the magnetoresistive sensor.

* * * * *